United States Patent [19]

de Rosa

[11] 4,206,887
[45] Jun. 10, 1980

[54] SAFETY BELT WITH ROLLER ARRANGEMENT

[75] Inventor: Daniel de Rosa, Le Mesnil Saint Denis, France

[73] Assignee: Regie Nationale des Usines Renault, Boulogne-Billancourt, France

[21] Appl. No.: 965,318

[22] Filed: Dec. 1, 1978

[30] Foreign Application Priority Data

Dec. 7, 1977 [FR] France .................................. 77 36815

[51] Int. Cl.² ....................... A62B 35/02; B65H 75/48
[52] U.S. Cl. ................................................ 242/107.4 A
[58] Field of Search ............................ 242/107–107.7; 297/385–389; 280/802–808

[56] References Cited

U.S. PATENT DOCUMENTS

| 3,178,225 | 4/1965 | Bayer | 297/386 |
| 3,301,503 | 1/1967 | Browning | 242/107 |
| 3,790,099 | 2/1974 | Beller | 242/107.4 R |
| 3,857,528 | 12/1974 | Fiala | 242/107.4 R |
| 3,871,470 | 3/1975 | Schwanz et al. | 242/107.4 R X |
| 3,927,846 | 12/1975 | Meissner | 242/107.4 R |

FOREIGN PATENT DOCUMENTS 2242523  3/1974  Fed. Rep. of Germany .
2093523  1/1972  France .
2190016  1/1974  France .

Primary Examiner—John M. Jillions
Attorney, Agent, or Firm—Oblon, Fisher, Spivak, McClelland & Maier

[57] ABSTRACT

Belts with rollers are provided to form force limitation members for a safety belt. The winding mechanism of the roller can take a first form, comprising a volume enveloped by the strap of the safety belt, and a second form comprising a smaller volume enveloped by the strap.

7 Claims, 6 Drawing Figures

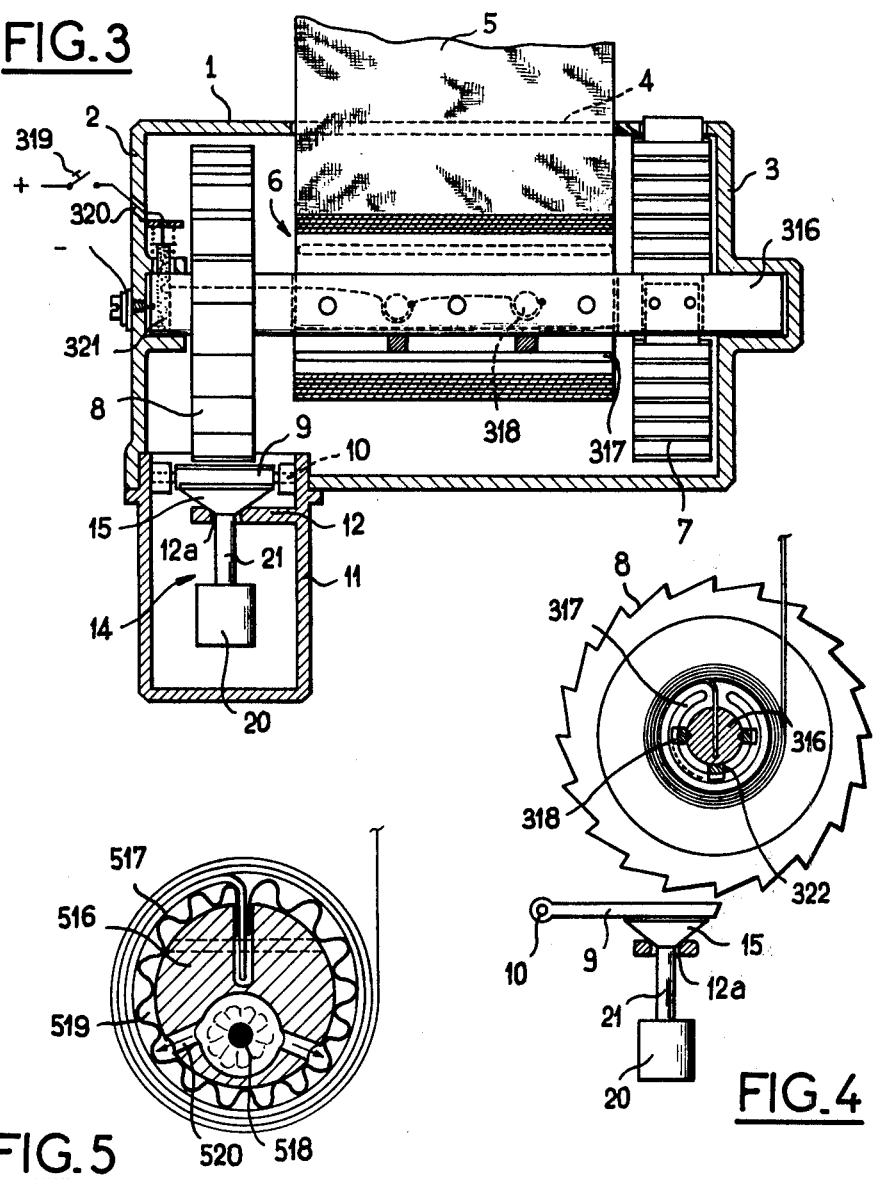
FIG.3 FIG.4 FIG.5 FIG.6
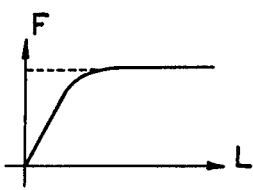

SAFETY BELT WITH ROLLER ARRANGEMENT

BACKGROUND OF THE INVENTION

1. Field of the Invention

The present invention is directed to a safety belt for vehicle occupants. The invention further concerns a safety belt with roller member arranged therewith to provide a force limitation member.

2. Description of the Prior Art

Automatic rollers intended to permit the extraction of the safety belt from the device when the vehicle passenger moves slowly are known. If the movement of the passenger takes place suddenly, a locking mechanism prevents extraction of the safety belt. The safety belt can likewise be locked when a deceleration exceeding a definite value occurs on the vehicle and roller.

The roller, which facilitates placing the safety belt in place, thus guarantees freedom of movement of the user.

If the vehicle suddenly encounters an obstacle, the safety belt prevents the user from being thrown forward and secures him in his seat. When the deceleration of the vehicle is relatively high, the force exerted on the body strapped by the safety belt can become excessive and cause bodily injury. This force is somewhat reduced as the result of elastic stretching of the safety belt which absorbs the energy.

Roller arrangements are already known which are associated with a force limitation member in the same assembly. The force limiter permits in general, restraining or locking the belt roller axle up to a predetermined loading. However, since the load supportable by the passengers of a vehicle is variable because such depends notably on their weight and constitution, it has been proposed to make the threshold of functioning of the limitation member adjustable. The successive improvements of the rollers have thus lead to relatively complex arrangements.

SUMMARY OF THE INVENTION

The present invention has as an object the provision for a roller arrangement with automatic locking which permits an elongation of the strap of the safety belt as a function of the traction force such that the absorption of the kinetic energy may be effective due to a slight displacement of the user of the belt under the action of his own inertia.

The present invention has as a further object the provision for a safety belt device with a roller including a force limitation member permitting a substantial elongation of the safety belt during the displacement of the user.

The invention also has as an object the provision for a safety belt device with a roller including an additional member for retraction of the strap for immobilizing the user in a collision, such member facilitating the elongation of the safety belt during the displacement of the user.

An additional object of the present invention is the provision for a safety belt device with a roller which includes a winding mechanism, and an element for locking and a force limitation member being associated with the winding mechanism.

In the preferred form of realization, this safety belt with roller device is characterized by the fact that the winding mechanism can take a first form comprising a volume enveloped by the strap of the safety belt and a second form comprising a smaller volume enveloped by the strap, the passage from the first form to the second being subject to the previous cooperation of the locking element with the winding mechanism.

According to the embodiments of the invention, the winding mechanism includes a composite spool for rolling up the strap of the safety belt.

According to a first embodiment, the roller spool is composed of an immobilized axle at one end of the strap and a compressible sleeve around the axle and enveloped by the strap of the safety belt.

According to an embodiment of the present invention, the compressible sleeve may take a first inflated form comprising an enclosed volume of gas and a second deflated form in which this volume is appreciably smaller including a pyrotechnic device for putting it in the first form and a relaxation device for bringing it into the second form.

BRIEF DESCRIPTION OF THE DRAWINGS

The objects and advantages of the invention will be better understood with the help of the description which follows of examples of realization, with reference to the attached drawing in which:

FIG. 3 is a cross-section of a variation of the roller arrangement;

FIG. 4 is a cross-section of the roller spool of the arrangement shown in FIG. 3;

FIG. 5 is a cross-section of the roller axis surrounded by an expandable sleeve, and FIG. 6 shows the force-displacement characteristic curve of the arrangement conforming to the present invention.

DETAILED DESCRIPTION OF THE THE PREFERRED EMBODIMENTS

Figure 1:
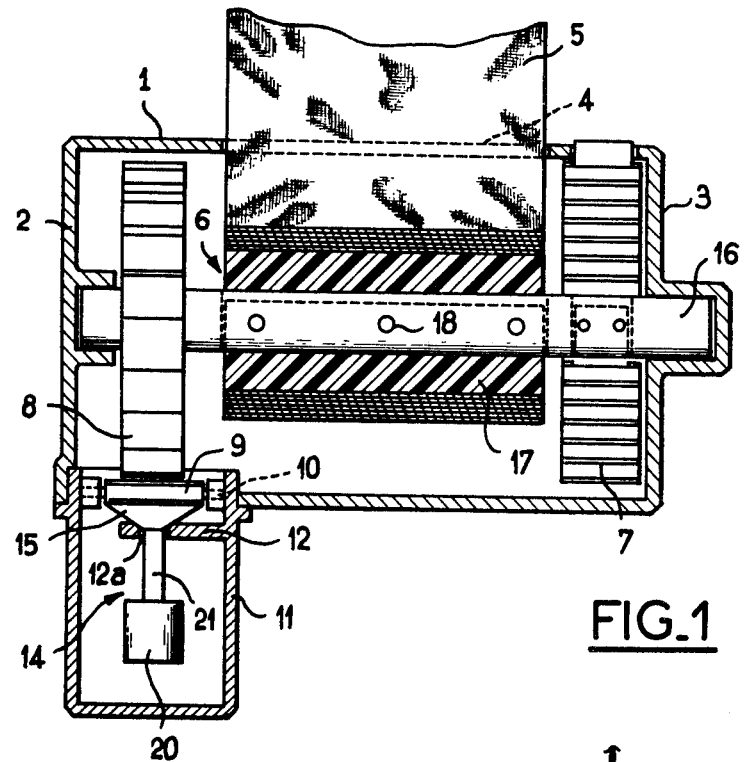
FIG. 1 is a view in cross-section of the roller arrangement.

In FIGS. 1 and 3, reference number 1 designates the housing of the roller arrangement comprising two end covers 2, 3 and a longitudinal slot 4 through which passes a strap of the safety belt 5 shown partially rolled up on a winding mechanism, the two ends of which are supported by the covers 2, 3. The winder 6 carries at one end a spiral return spring 7 the other end of which is attached to the housing 1. The spiral spring 7 is tightened in such a manner as to exert a winding traction or force on the strap 5.

A ratchet wheel 8 is likewise mounted integral in rotation with winder 6. The ratchet wheel 8 can cooperate with a blocking element in the form of a lever 9 mounted so as to pivot about an axis 10 situated in a case 11 fastened to the housing 1. The case 11 contains in addition a support 12 provided with an orifice 12a in which rests the movable element of the inertia member 14. The inertia member 14 may be, for example, in the form of a pendular body constituting a truncated conical head 15 and a heavy body 20 connected by a rod 21.

The operation of the roller arrangement is well known. The winder 6 automatically rolls up the belt under the action of the return spring 7 and can be blocked by the engagement of the lever 9 with one of the teeth of the ratchet wheel 8. To this end, the inertia of the body 20 permits obtaining the blockage of the winder 6.

The winding mechanism constitutes a solid or hollow axle or belt winding roller 16 which immobilizes the end of the strap 5. A compressible sleeve which surrounds the axle will now be described with reference to FIGS. 1-5 which illustrate different embodiments of the sleeve.

Figure 2:
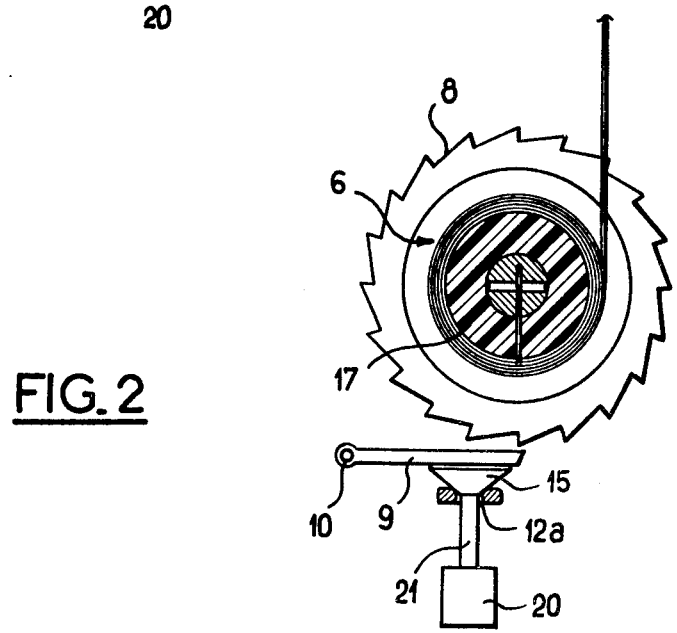
FIG. 2 is a cross-section of the roller spool of the arrangement shown in FIG. 1.

According to the embodiment represented in FIGS. 1 and 2 the winding mechanism is composed of the axle or belt winding roller 16 and a sleeve 17 of cellular material such as a polyurethane foam, compressible under the action of the tension of the strap. The end of the strap 5 is fastened to the axle 16 by means of rivets 18 and a radial slot in the sleeve 17 permits rolling up the strap on the winding mechanism assembly consisting of axle 16 and sleeve 17, the volume of which is thus enveloped by the strap 5.

Due to the locking against rotation of the axle 16, the traction force on the strap 5 exerts a radial compressive force on the sleeve 17 and such becomes smaller in volume. The corresponding reduction in diameter of the sleeve under an essentially constant force permits obtaining a supplementary elongation of the strap outside the roller arrangement.

According to the second embodiment shown in FIGS. 3 and 4, the winding mechanism includes an axle or roller 316 and a deformable sleeve 317. According to one characteristic of the invention, the sleeve 317 constitutes a porous sleeve 317 inflatable under the action of the pressure of gases liberated by the firing of a pyrotechnic charge 318. Thus the sleeve 317 takes a first inflated form containing a given volume of enclosed gas. During inflation of the sleeve 317 its diameter increases, which permits obtaining an initial tension in the safety belt even when the axle 316 is initially locked. As in the preceding case, the traction effort on the strap 5 exerts a radial compressive force on the initially inflated sleeve 317. This then reassumes its deflated form as the result of the escape of the gases through the dilated pores of the sleeve which is accompanied by a significant reduction in its volume and its outer diameter. This mode of functioning thus likewise permits obtaining a supplementary elongation of the belt outside the roller arrangement.

The firing device for the pyrotechnic charge 318 is conventionally activated by the automatic closure of a command switch 319. To this end, the fixed contact of the switch is connected to a sliding contact 320 which presses against a conducting part 321 of the axle 316. This conducting part 321, electrically insulated from the axle 316, is connected by means of a wire to the charge 318 located in the sleeve 317. It is to be noted that the sleeve 317 is fixed in rotation with respect to the axle 316 by means of keys 322 which provide passage for the wire from the axle 316 to the charges 318. Another supply terminal for the pyrotechnic charge is on the cover 2 in the form of a spade terminal, a part of which is screwed into contact with the conducting axle 316.

According to the embodiment in FIG. 5, the winding mechanism is composed of a partly hollow axle 516 and a sleeve 517 of corrugated sheet metal. The latter is fastened to the axle or roller 516 by means of a strip weld, for example, and delimits in combination with the periphery of the axle 516 an expansion chamber 519 for gases liberated as the result of the firing of the pyrotechnic charge 518 located in the axle 516. To this end, the axle 516 includes a series of radial orifices 520 facilitating the passage of gases from the axle 516 to the chamber 519. The arrangement for firing the charge 518 could be, for example, that described in connection with FIGS. 3 and 4 but any other equivalent arrangement could be utilized. It would indeed be possible to use a fixed pyrotechnic charge disposed, for example, in the axle 516 and wired directly through the cover 2. It is to be noted that the solid part of the axle 516 provides for retention of the free end of the strap of the safety belt.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A safety belt assembly which comprises:
   a belt winding roller;
   a belt winding housing within which said roller is disposed;
   an element for rigidly locking said roller with respect to said housing;
   a resilient, compressible sleeve mounted on said roller wherein said sleeve comprises a first form having a volume enveloped by a strap portion of the safety belt, and a second form upon a traction force being applied to said belt, comprising a smaller volume enveloped by said strap portion, wherein transition from the first form to the second form occurs due to said traction force being applied to said belt subsequent to locking of said roller; and
   means separate from said sleeve for securing said belt to said roller.

2. The safety belt assembly; as set forth in claim 1, wherein the compressible sleeve comprises a cellular material.

3. The safety belt assembly as set forth in claim 1, wherein the compressible sleeve includes a first inflated form which contains a volume of enclosed gas and a second deflated form which contains a volume of gas which is significantly smaller.

4. The safety belt assembly as set forth in claim 1, further comprises a pyrotechnic charge and means for firing said pyrotechnic charge wherein the compressible sleeve includes an outer envelope and the roller and the outer envelope of the sleeve includes a space provided therebetween which constitutes at least a part of the volume enveloped by said strap portion including gases liberated as a result of the firing of said pyrotechnic charge.

5. The safety belt assembly as set forth in claim 3, wherein the compressible sleeve includes a deformable wall and a pyrotechnic charge mounted in the roller, the roller including holes opening in contact with the deformable wall of the sleeve.

6. The safety belt assembly as set forth in claim 1, which further comprises a pyrotechnic charge mounted in said compressible sleeve and means for firing said pyrotechnic charge wherein the compressible sleeve surrounding the roller comprises a sleeve inflatable under the action of said pyrotechnic charge, the firing of which liberates a volume of gas.

7. A safety belt as set forth in claim 1, wherein said roller and said sleeve include aligned openings formed therein, said means for securing said belt assembly to said roller comprising said belt being positioned within said openings.

* * * * *